Patented Apr. 12, 1938

2,113,960

UNITED STATES PATENT OFFICE 2,113,960

METHOD OF SEPARATING SATURATED AND UNSATURATED HIGHER ALIPHATIC ORGANIC COMPOUNDS FROM MIXTURES THEREOF

Wolfgang Grote, Ernst Hundsdörfer, and Josef Moos, Berlin, Germany, assignors to the firm Edeleanu Gesellschaft m. b. H., Berlin, Germany, a corporation of Germany No Drawing. Application July 10, 1934, Serial No. 734,560. In Germany July 12, 1933

9 Claims. (Cl. 260—106)

Our invention relates to a method of separating into their saturated and unsaturated constituents, mixtures of organic substances of high molecular weight, such as waxes, fats, and substances derivable therefrom including fatty acid esters, whose acids contain not less than seven carbon atoms per molecule, and higher fatty acids and alcohols containing not less than seven carbon atoms per molecule.

In the naphtha or petroleum industry selective solvents are used to an increasing extent for separating naphtha fractions into saturated and unsaturated constituents. The use of such solvents has also been proposed for separating saturated and unsaturated constituents of fats and waxes but attempts in this respect have not been successful as yet as applied to mixtures containing alcohols and fatty acids.

It is an object of our invention to perform the above described method satisfactorily with a readily available selective solvent. To this end, we treat the mixture with a solvent which at a stated temperature is selective toward saturated constituents of higher fatty acids, esters and alcohols, that is, it will dissolve unsaturated constituents but not saturated constituents at the stated temperature.

We have found that a separation of mixtures containing waxes, fats, and substances containing fatty acid esters, higher fatty acids, and alcohols, into saturated constituents on the one hand, and into unsaturated constituents on the other hand, is accomplished satisfactorily chemically as well as technically by placing the substances of the mixture into intimate contact with a selective solvent of the kind referred to, i. e., one which at definite temperatures, or within a definite temperature range, possesses selective solvent power for unsaturated constituents, and separating the saturated constituents which are present in solid or undissolved condition, from the solution of the unsaturated constituents.

The simplest way of bringing the substances in the mixture which are to be separated, into the necessary intimate contact with the solvent, is by heating the mixture to a temperature at which its substances are completely dissolved in the solvent, cooling the solution until the saturated constituent, or constituents, are crystallized out, and separating the crystals or insoluble matter by suitable mechanical means, such as filters. The separated matter may, if required, be further purified by dissolving it in fresh solvent, once or several times, and cooling the solution for separating the solid matter therefrom. In many cases, it is sufficient to wash the separated matter one or more times with selective solvent. The successive treatments of dissolving the mixture and of washing the crystallized product may obviously be combined. In order to save solvent, the second filtrate and any subsequent filtrates may be utilized for dissolving the untreated product. The unsaturated constituents are obtained by evaporating the solvent from the first filtrate, or from subsequent filtrates.

A suitable selective solvent for practicing our invention should completely and easily dissolve the substances in the mixture at temperatures of 25° C. to 50° C., and at lower temperatures, ranging from 15° below zero to 15° above zero centigrade, it should dissolve unsaturated constituents appreciably more easily than saturated constituents. Examples of such solvents are those which are known in the petroleum industry as suitable for splitting naphtha fractions into constituents rich in hydrogen and known as paraffinic ones, and into constituents poor in hydrogen and known as aromatic and unsaturated ones, for instance, liquid sulphur dioxide, phenol, nitrobenzene, $\beta$ and $\beta'$ dichlorethyl ether, furfurol, acetone, or mixtures of liquid sulphur dioxide and benzene; phenol and water or glycerine; furfurol and benzene, etc. For other solvents see "Industrial and Engineering Chemistry", 1931, vol. 23, No. 7, page 753.

We have found that carbon disulphide is particularly advantageous as solvent for carrying out the process described.

The original products which may be treated in accordance with our invention may be natural substances as well as substances obtained synthetically. Such substances are waxes and fats, that is, fatty acid esters whose acids contain seven or more carbon atoms per molecule, as well as higher fatty acids and alcohols with seven or more carbon atoms per molecule, which contain saturated and unsaturated constituents together. Products may also be used which contain mixtures of the mentioned substances. With respect to mixtures of fatty acids, such acids as are obtained by various saponification processes from animal or vegetable tallows, bone fat, palm oil, hardened fish oil, or other oil, may be successfully treated. Alcohols are obtained, for instance, by splitting spermaceti, but may also be made by reduction of the corresponding fatty acids. Instead of the fatty acids, the fats themselves, i. e., fatty acid esters, may be separated. An example is the so-called fine tallow which by our method may be separated into oleo margarine and oleo stearine. Another example is the so-called cotton oil.

The following example illustrates the method as applied to the separation of saturated and unsaturated constituents of a partly refined fatty acid: 1000 grams of the mixture are dissolved in 1500 ccm. of carbon disulphide at 35° C. and recrystallized at 15° C. below zero. The saturated constituent is crystallized out, and after the carbon disulphide is removed from the crystal mixture and the filtrate, the saturated fatty acids are found to have the iodine value 22 and the unsaturated ones the iodine value 61.

We claim:

1. A method of separating saturated components from mixtures of saturated and unsaturated higher fatty acids, comprising mixing the mixture with carbon disulphide to dissolve unsaturated constituents and separating out a saturated component at a low temperature at which the latter is relatively insoluble.

2. A method of separating saturated components from mixtures of saturated and unsaturated higher alcohols, comprising dissolving the mixture in carbon disulphide, lowering the temperature to precipitate out a saturated component, and removing the latter.

3. A method of separating saturated components from a mixture of saturated and unsaturated higher fatty acids, comprising dissolving the mixture in carbon disulphide, chilling the resultant solution to precipitate out a saturated component, and removing the latter.

4. A method of separating saturated components from a mixture of higher fatty acids containing both saturated and unsaturated acids, comprising dissolving the mixture in a larger volume of carbon disulphide than that of the original mixture at a temperature of 25–50° C., chilling the resultant solution to a temperature of −15° to +15° C. to precipitate out a saturated component, and separating out the precipitate.

5. A method of separating saturated components from mixtures of saturated and unsaturated esters of higher fatty acids, comprising mixing the mixture with carbon disulphide to dissolve unsaturated constituents and separating out a saturated component at a low temperature at which the latter is relatively insoluble.

6. A method of separating saturated components from mixtures of saturated and unsaturated esters of higher fatty acids, comprising dissolving the mixture in carbon disulphide, lowering the temperature to precipitate out a saturated component, and removing the latter.

7. A method of separating saturated components from mixtures of saturated and unsaturated higher alcohols, comprising mixing the mixture with carbon disulphide to dissolve unsaturated constituents and separating out a saturated component at a low temperature at which the latter is relatively insoluble.

8. A method of separating saturated components from mixtures of saturated and unsaturated components of higher aliphatic organic compounds derivable from a member of the group consisting of fats and waxes, comprising mixing the mixture with carbon disulphide to dissolve unsaturated constituents and separating out a saturated component at a low temperature at which the latter is relatively insoluble.

9. A method of separating saturated components from mixtures of saturated and unsaturated components of higher aliphatic organic compounds derivable from a member of the group consisting of fats and waxes, comprising dissolving the mixture in carbon disulphide, lowering the temperature to precipitate out a saturated component, and removing the latter.

WOLFGANG GROTE.
ERNST HUNDSDÖRFER.
JOSEF MOOS.